Dec. 26, 1922.
T. ALEXANDER.
REEL FOR BARBING MACHINES.
FILED OCT. 20, 1919.
1,440,122
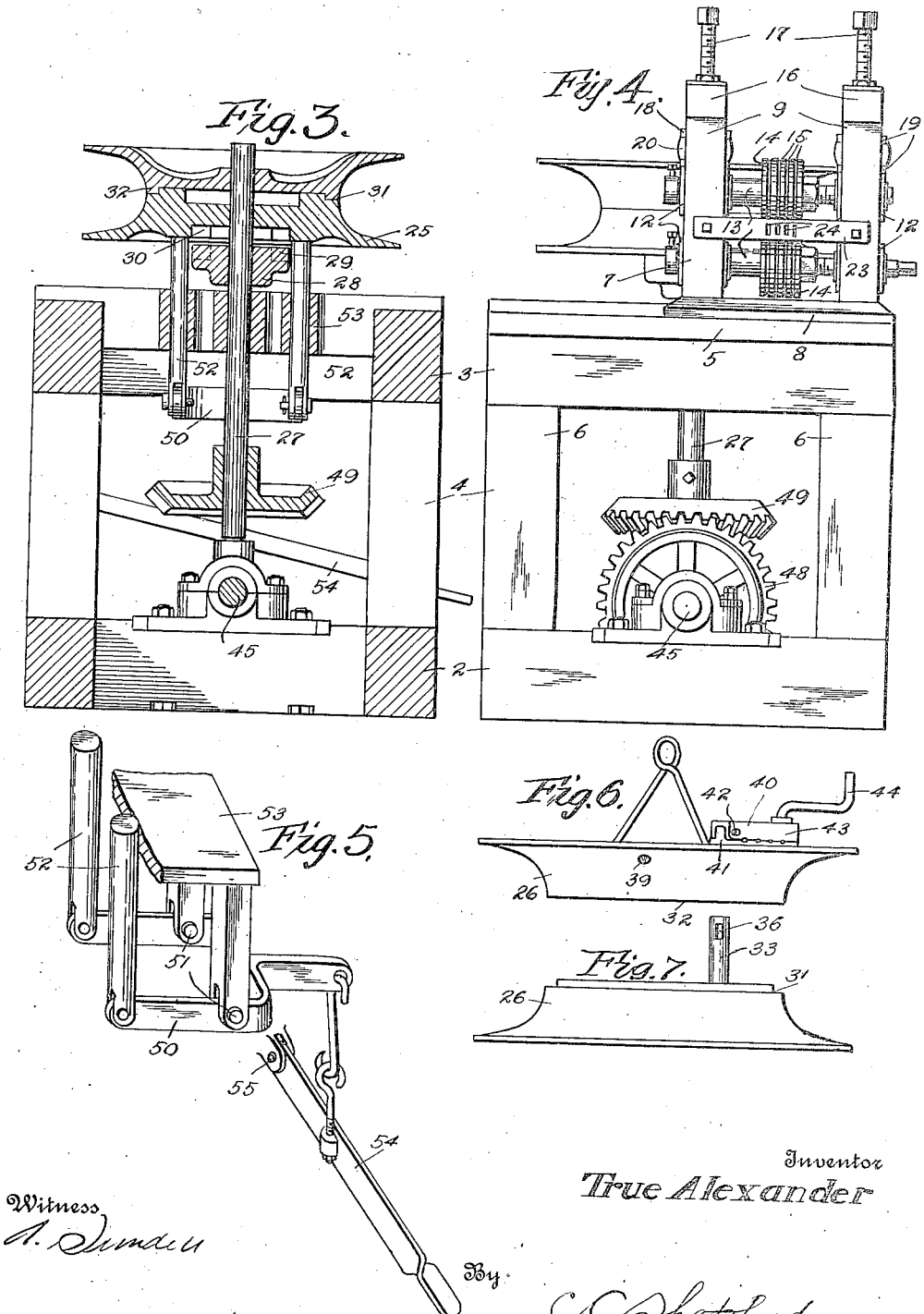
Inventor
True Alexander
Witness
By
C. C. Shepherd, Attorney Patented Dec. 26, 1922.

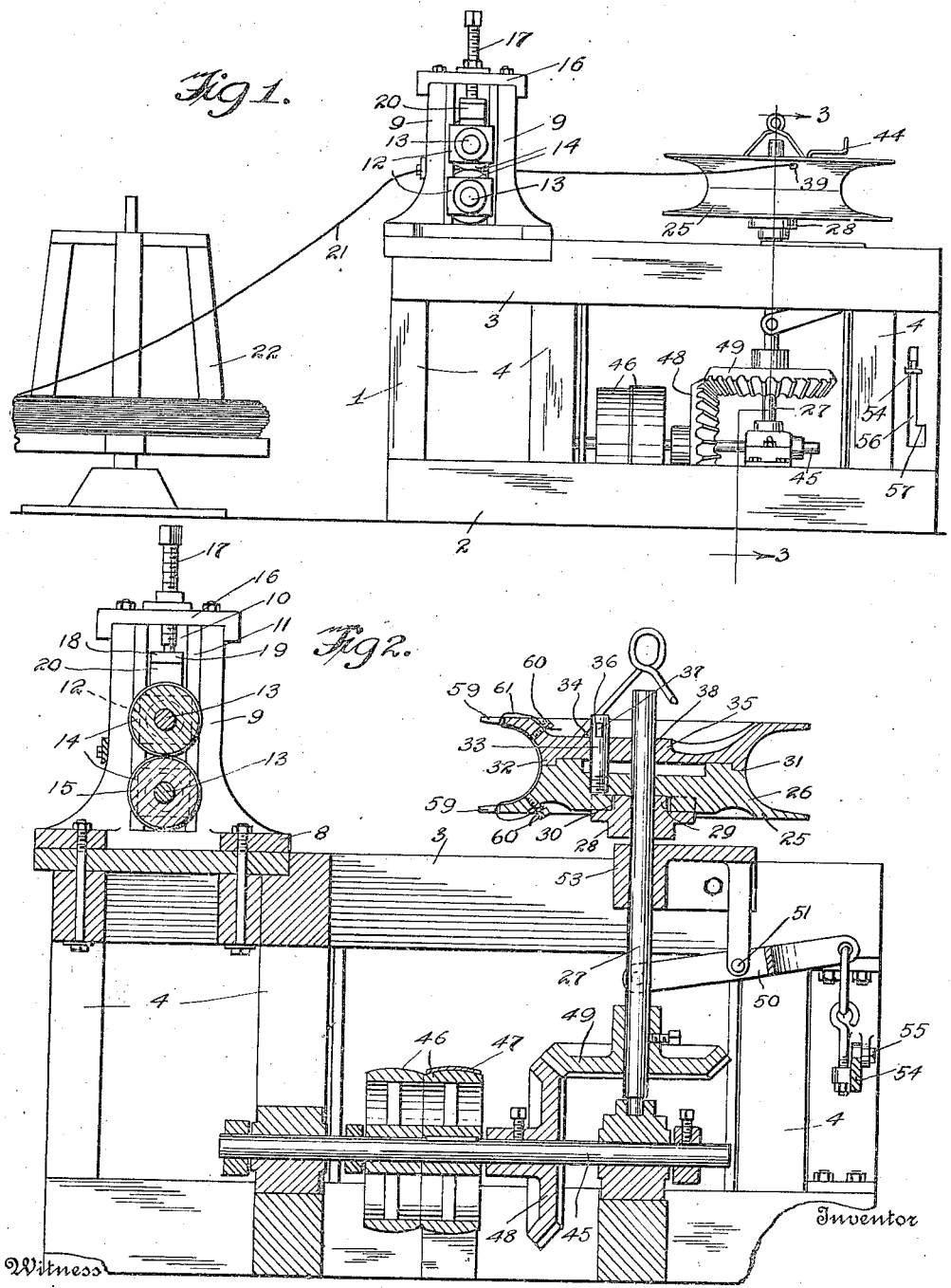

1,440,122

UNITED STATES PATENT OFFICE.

TRUE ALEXANDER, OF ASHLAND, KENTUCKY, ASSIGNOR TO NORTON IRON WORKS, OF ASHLAND, KENTUCKY, A CORPORATION.

REEL FOR BARBING MACHINES.

Application filed October 20, 1919. Serial No. 332,018.

*To all whom it may concern:*

Be it known that TRUE ALEXANDER, a citizen of the United States, residing at Ashland, in the county of Boyd and State of Kentucky, has invented certain new and useful Improvements in Reels for Barbing Machines, of which the following is a specification.

This invention relates broadly to barbing machines, and has particular reference to improved machinery for roughening or barbing wire prior to the final process of nail formation.

Another object of the invention rests in a nail barbing machine wherein is provided improved means for effecting the passage of reel carried wire through a plurality of rotatable barbing members and to provide resilient means in co-operation with said members whereby the latter will be caused to exert required pressure upon wire passing therethrough to effect barb formations upon said wire, and to provide said members with annular barbing grooves which are adapted to receive wire of different gage.

Further a more important object of the invention resides in the provision of an improved reel structure about which the wire, leaving the barbing members, is adapted to be wound, said reel structure consisting of a plurality of separable upper and lower sections which are adapted to be connected in firm relation so that a composite reel will be formed for the reception of the wire, and to provide means in conjunction with said sections whereby the latter may be separated so that the removal of wire wound about the same may be effected in an expeditious, simple and effective manner.

A still further object of the invention resides in the provision of improved driving means for effecting the rotation of the reel structure and to provide mechanism in conjunction with said driving means for arresting the rotation of said reel structure at desired periods.

Other objects of the invention reside in the provision of a vise member carried by the upper of said reel sections, said member being situated to receive the inner end of the barbed and scored wire wound about the reel structure, the vise member being capable of firmly gripping the end of said wire so that the rotation of the reel structure will cause the wrapping or the winding of the wire thereabout; in means co-operative with the sections of the reel structure for insuring an accurate and close fit between the same and to insure the simultaneous operation of both of said sections in a unitary manner, and finally, to construct the machine as a whole so that the same will be capable of being successfully operated over extended periods without damage or undue breakage thereto, and to render its mechanism simple, reliable and positive with accompanying ease of operation and control.

With these and further objects in view, as will appear as the description proceeds, the invention accordingly consists in the novel features of construction, combination of elements, and arrangements of parts, hereinafter to be fully described and to have the scope thereof pointed out in the claims hereunto appended.

In the accompanying drawings, forming a part of this specification, and in which similar characters of reference denote like and corresponding parts:

Figure 1 is a side elevation of the improved barbing machine comprising the present invention.

Figure 2 is a vertical longitudinal sectional view,

Figure 3 is a vertical transverse sectional view taken on the line 3—3 of Figure 1, Figure 4 is a view in elevation of the forward side of the machine, Figure 5 is a detail view disclosing the mechanism for throwing the reel structure into and out of driving relation with its driving spindle, Figure 6 is a detail view of the upper section of the reel structure, and Figure 7 is a similar view of the lower section of said reel structure.

Referring more particularly to the structural details of the barbing machine disclosed in the drawings, and in which the preferred principles of the invention are embodied, use is made of a frame structure 1. This structure may consist of spaced parallel bottom sills 2 and similarly spaced and extending upper sills 3, said sills being united by means of vertically disposed members 4. These parts are preferably of sturdy construction and are firmly united so that a rigid foundation will be provided for the mechanism which the frame carries. Forming a part of the frame structure 1 is a base plate 5, which is located at the forward end of the machine and is supported by means of vertical posts 6. Mounted upon the plate 5 is the wire barbing mechanism 7. This mechanism includes a casting formed to embody a base portion 8, which is bolted or otherwise mounted upon the base 5 and comprises a pair of spaced vertically extending standards 9. The latter are provided with vertical slots 10 having guide ribs 11 formed on the side walls thereof. Slidably mounted within the slots 10 are bearing blocks 12, which are grooved vertically to receive the ribs 11 whereby guided vertical movements of the blocks within said slots is permitted. Rotatably journaled within said blocks is a pair of shafts 13, which carry barbing rollers or members 14. These rollers are located in vertical alignment, and are provided with scored grooves 15 which are situated in registering relation, said grooves being of varying size so that the rollers will be capable of receiving and barbing wire of varying gage. The rollers are normally maintained in contact with each other by providing the tops of the standards 9 with cap blocks 16, and these blocks are provided with threaded, adjustable and vertically extending set screws 17. The lower ends of the set screws extend within the slots 10 and are arranged to frictionally press upon resilient members 18, which are situated within the slots 10 and are mounted upon the upper of the blocks 12. The members 18 are formed to embody upper and lower metallic plates 19, between which are preferably imposed blocks of solid rubber 20, and it will be obvious that by suitably adjusting the set screws 17, resilient pressure may be imparted upon the upper of the bearing blocks 12 so that the roller 14 carried thereby will be pressed into resilient engagement with the corresponding roller carried by the lower shaft, the arrangement being such that the rollers 14 will normally be maintained in frictional contact, however, upon the passage of a wire through any one of the barbing grooves 15 of said rollers, the latter will be slightly separated against the pressure exercised by the resilient members 18 so that corresponding pressure will be imparted to the wire passing between said rollers. This pressure is sufficient to press out the scored or barbed formations upon said wire during its passage between said rollers.

Before being introduced between the rollers 14, the wire 21 is contained upon a rotatable drum 22 and is wound off of this drum during the passage of said wire between said rollers. A guide plate 23 may be provided in advance of the rollers 14 to receive the wire 21 as the latter passes from the drum 22, and to properly guide the wire into cooperation with the rollers. This plate may be provided with a plurality of slots 24 which are of varying size to receive wire of different gage.

In order to withdraw wire from the drum 22 and to effect its passage through the barbing rollers and to finally receive the barbed wire, the present invention contemplates the provision of an improved reel structure 25, upon which the wire is wound and bundled after the same has been scored, driving means being associated with said reel structure to effect its rotation and the consequent advance of the wire 21 in its path of traffic through the machine. This reel structure consists of a pair of upper and lower sections 26, which are substantially of duplicate formation and when in registering relation will provide a drum about which the wire 21 may be wound. Extending upwardly through the frame structure 1 is a driving spindle 27 and keyed to this spindle above the horizontal plane of the frame structure is a driving collar 28, said collar being provided with an upper clutch surface 29. The underside of the lower section 26 is provided with a socket 30 shaped to receive the upper clutch portion 29 of the collar 28, so that when the lower section 26 is deposited or placed upon the collar 28, the rotation of the spindle 27 will be imparted to the reel structure 25 as a whole. To insure accurate registration between the sections 26 and a unitary rotation of the latter when the same are assembled, the lower section has its upper surface formed with an annular recess 31 into which is adapted to be placed an annular rim 32 formed upon the lower surface of the upper section. This construction serves to eliminate relative lateral shifting of the two sections and maintains true registry between parts. To secure said sections in this assembled relation, the lower section is provided with a rigid vertically protruding stud 33, which is arranged to project through an opening 34 formed in the upper section, the stud 33 being of sufficient length to project above the strengthening rib formation 35 of said upper section and is provided at its upper end with a slot 36. A wedge pin or block 37 is adapted to project through this slot 36 and into engagement with the rib formation 35, whereby when the block 37 is securely driven into its operative position, the said sections 26 will be firmly retained in their united positions and will be capable of rotating together. It will of course be understood that the sections 26 are provided with registering axial openings 38 for the reception of the spindle 27 and that the reel structure is capable of rotating freely about the spindle 27 when the collar 28 of the latter is out of engagement with the socket 30 of the lower section 26.

To firmly unite the free end of the wire 21 to the reel structure, so that the rotation of the latter will result in the passage of said wire between the rollers 14, the upper section 26 is formed with a transverse opening 39 which extends through the concave wall thereof and into its hollow interior. Situated within the upper section and carried by the rib formation thereof is a vise 40 by means of which the free end of said wire is clamped to the reel structure. This vise may be of any desired formation, but in the present instance consists of a lower jaw 41 which is pivoted as at 42 to the upper jaw 43. A manually operable screw 44 is arranged to pass through said jaws so that when suitably rotated said screw will cause the jaws to be brought together and in this manner will enable the same to securely clamp the free end of said wire between said jaws. Openings may be provided in the adjacent faces of said jaws to receive the wire 21. It will thus be manifest that the wire will be passed between said rollers from the drum 22 about which it is initially wound in bundle formation and after passing through said rollers the free end of the wire will be trained through the opening 39 of the reel structure and hence into firmly clamped relationship with the vise 40. By being securely connected with the latter the rotation of the reel structure will result in the winding of the wire 21 thereabout, so that said wire may be again bundled after its passage through the barbing or scoring rollers, as will be clearly understood. In order to effect the rotation of the reel structure, the driving mechanism therefor may consist of a power shaft 45, which is adapted to be journaled for rotation in suitable bearings provided in the under portion of the frame structure 1, and this shaft may be equipped with the usual loose and tight pulley wheels 46 about which a drive belt 47 may be trained, the belt leading to any suitable prime mover so that when in engagement with the pulley fast to the shaft 45 rotation will be imparted to the latter. In the present construction the shaft 45 is provided with a beveled gear 48, which is arranged to mesh with a similar gear 49 provided upon the end of the spindle 27 so that in this manner the rotation of the shaft 45 will be simultaneously imparted to the spindle 27 and hence to the reel structure.

After the reel structure has been wound with wire to its maximum capacity its operation may be temporarily halted to permit of the removal of the wire bundled thereabout and to permit of further operations of the machine. To this end, there is employed a yoke shaped lever 50, which is pivoted as at 51 to the frame structure at a position contiguous to the spindle 27. The yoke shaped extremities of the lever 50 are in turn pivotally connected with a pair of vertically movable pins 52, which are slidably mounted in a transversely extending bar 53 forming a part of the frame structure 1, and in which the upper end of the spindle 27 is journaled. When the lever 50 occupies an inactive position the upper ends of the pins 52 will assume a plane beneath the lower section 26, however, upon the oscillation of the lever 50 to an active position, said pins 52 will be elevated and forced into contact with the underside of said lower section so that the reel structure will be caused to be elevated and disconnected from driving relationship with respect to the driving collar 28, thus causing an arrest in rotation of the reel structure so that the wire wound about the latter may be conveniently removed. The lever 50 may be operated through the provision of an actuating lever 54, which is pivoted as at 55 upon the frame structure 1, and has its outer end mounted for vertical movement within a slot 56 formed in one of the vertical members 4. This slot is provided at its lower end with an offset shoulder 57, whereby when the lever 54 is oscillated so as to effect the elevation of the pins 52, the outer end of the same may be forced into engagement with the shoulders 57 so that the reel structure as a whole may be retained in its elevated position and out of rotatable connection with the spindle 27.

To effect the separation of the sections 26 and a consequent removal of the bundled wire from the reel structure, it is simply necessary to remove the wedge block 37 from its receiving slot formed in the stud 33, and hence through the provision of a crane structure provided in connection with the machine, said upper section may be quickly and conveniently removed from its engagement with the lower section thus leaving the wire contained upon said lower section free to be conveniently removed. Preferably, the sections of the reel structure are provided with recesses 59 in their periphery and are further formed with registering studs 60 on their inner surfaces. Then, before the wire 21 is bundled around the sections, a tie wire 61 is positioned so as to extend across the concave face of said sections, the free ends of said wire being passed through the recess 59 and then wrapped about the studs 60. Obviously, before the sections are removed from registering relation, the tie wire 61 is tied about the bundle of wire wrapped around the sections, so that upon the removal of the upper section, said wire will be retained in its bundled condition through the agency of the tie wire 61.

From the foregoing description, taken in connection with the accompanying drawings, it will be apparent that there is provided a machine of considerable utility in the capacity stated. Owing to the two part construction of the winding reel 25 great convenience is obtained in effecting the removal of wound wire therefrom and it is believed that in this particular the present invention comprises a distinct improvement over past structures. By virtue of the two part formation of the winding reel the bundle of wire may be quickly and easily removed therefrom with but a minimum of time consumption and labor so that this period of idleness on part of the machine will be a negligible factor when viewed from a production standpoint. Through the driving mechanism and clutches described, the rotation and operation of the reel structure may be readily governed and the necessity of handling heavy and cumbersome parts on the part of the operator is substantially avoided.

What I claim is:

1. In a wire barbing machine, a reel structure for receiving and winding in coils lengths of wire barbed by the machine, means for supporting and rotating said reel structure, the circumferential edges of said reel structure being provided with radial grooves capable of receiving and tying wire, a stud fixed to the under side of said structure and capable of securing one end of said tying wire, and a gripping vise carried by the upper surface of said reel structure and operative to receive and retain the other end of said tying wire.

2. In a wire barbing machine, a reel structure for receiving and winding in coils lengths of wire barbed by the machine, said reel structure comprising a pair of separable sections capable of facilitating the removal of coiled wire therefrom, means for effecting the support and rotation of said reel structure, means for retaining said sections in assembled relationship, and a bail carried by the upper of said sections and operative to facilitate the separation of the sections.

In testimony whereof I affix my signature.

TRUE ALEXANDER.

Witnesses:
E. E. AYERS,
O. O. HAMLEPP.